3,218,345
POLY (ISOCYANATOETHYL) AMINES AND PROCESS THEREFOR

Norman B. Rainer, North Bellmore, N.Y., assignor to Coastal Interchemical Company, Brooklyn, N.Y.
No Drawing. Filed July 17, 1962, Ser. No. 210,567
4 Claims. (Cl. 260—453)

This invention relates to novel poly (isocyanatoethyl) amines and methods for their production.

It is an object of this invention to provide novel poly (isocyanatoethyl) amines useful as chemical cross-linking agents and as co-reactants in the production of useful polyurethane resins.

It is another object of this invention to provide a novel process for the preparation of beta amino isocyanates.

Other objects and advantages will become apparent hereinafter.

The objects of this invention are accomplished in general by treating cyanomethylamine compounds having the structure:

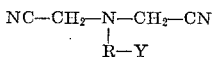

wherein R is a bivalent organic radical having no active hydrogen, and Y is N, N bis cyanomethylamino, hydrogen, or cyano, with hydrogen, a hydrogenation catalyst, phosgene, and an acid acceptor substance.

The poly (isocyanatoethyl) amine compounds which may be prepared by the process of this invention have the structure:

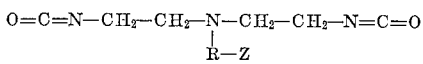

wherein R is defined as above, and Z is hydrogen, N, N bis (isocyanatoethyl) amino, or isocyanatomethyl.

The cyanomethyl amines employed in the process of this invention are in general commonly available or easily prepared by the reaction of formaldehyde and HCN with a primary amine or ammonia. (L. S. Luskin, et al., J. Am. Chem. Soc. 78, 4042 (1956).) Either mono or poly primary amines may be employed, with concordant formation of one or more cyanomethylamine groups in a molecule. When ammonia is employed for the production of the cyanomethylamine compound, nitrilotriacetonitrile is produced. When a mono primary amine is employed for the production of the cyanomethylamine compound, N-substituted iminodiacetonitrile compounds are obtained, typical N-substituents being methyl, ethyl, propyl, 2-ethylhexyl, stearyl, cyclohexyl, benzyl, and other radicals analogous thereto. When a di-primary amine is employed for the production of the cyanomethylamine compound, typical representative compounds produced include: ethylenediamine tetraacetonitrile, hexane 1,6 bis dicyanomethylamine, xylylene bis dicyanomethylamine, and analogous substituted products. Except for the case of nitrilotriacetonitrile, the cyanomethylamine compounds employed in the practice of this invention contain at least one N,N bis cyanomethylamine group. The group R may thus be alkylene, arylene, alkylarylene, and substituent-containing derivatives thereof. The group R should not however, contain active hydrogen as defined by the Zerewitinoff test as described by Kohler in J. Am. Chem. Soc., 49, 3181 (1927).

The reaction process of this invention is carried out in an autoclave or analogous vessel designed to retain a multiphase system under conditions of elevated temperature and pressure. Hydrogen pressures suitable in the practice of this invention range from 50 to 3000 p.s.i. Selection of a suitable specific pressure for a given reaction will depend upon the desired rate of reaction, catalyst employed, specific nature and concentration of cyanomethylamine, temperature, and other factors. In general, an optimum hydrogen pressure may be easily determined for a given set of conditions with minimum experimentation in the simple adjustment of obvious parameters. Conditions are to be avoided however, which would result in the hydrogenation of the isocyanate product. Thus, the mildest conditions of hydrogen pressure which give a reasonably rapid rate of reaction will generally afford the highest yields of isocyanate product. Pressures in the range of 50 to 500 p.s.i.g. are generally found preferable. About 1.7 to 2.0 moles of hydrogen are required per mole of nitrile groups for the production of the isocyanates of this invention. Further hydrogen uptake, under more forceful hydrogen pressures or with prolonged reaction durations generally decreases the yield of isocyanate product. Measurements of amounts of hydrogen employed are best carried out by observance of presure drops in a calibrated, fixed-volume reservoir.

Catalysts which may be employed include Raney nickel, copper chromite, palladium precipitated on charcoal, platinum oxide, chloroplatinic acid-sodium borohydride precipitates formed in situ, and other catalysts employed in conventional hydrogenations. An amount of catalyst equal to about 2–10% of the weight of the cyanomethylamine compound is preferred, and may be completely added at the beginning of the reaction, or may be proportionately added during the course of the reaction.

Since the cyanomethylamine compounds are relatively high melting solids, it is generally preferable to employ an inert liquid vehicle to dissolve or suspend the cyanomethylamine during the course of the reaction. Suitable liquid vehicles include dioxane, xylene, chlorobenzene, cyclohexane, dipropyl ketone, dibutyl ether, ethyl acetate, pyridine, and analogous species containing no reactive hydrogen atoms as defined by the Zerewitinoff test. An amount of liquid vehicle is generally employed to provide a cyanomethylamine concentration preferably between about 5% and 40%.

The phosgene employed in the process of this invention is dissolved in the reaction solution under high pressure, preferably prior to the addition of hydrogen to the system. About 1.0 to 1.4 moles of phosgene are employed per mole of nitrile groups in the cyanomethylamine. In a typical reaction procedure, the phosgene is led under pressure into a cold, agitated, anhydrous fluid mixture containing the cyanoethylamine compound, liquid vehicle, acid acceptor, and hydrogenation catalyst. The system is then sealed to the phosgene, opened to a calibrated volume of hydrogen at a higher pressure than the phosgene, and the mixture is heated to 50° C.–150° C. with continuous agitation. It is preferred to add initially the entire amount of phosgene required for the reaction, but when this is not feasible, the remaining portion may be added at a later stage of the reaction. Although the role of the phosgene, and the mechanism of the reaction are not unequivocably explainable, it is suspected that the phosgene reacts stepwise with partially hydrogenated nitrile intermediates, as indicated in the following sequence:

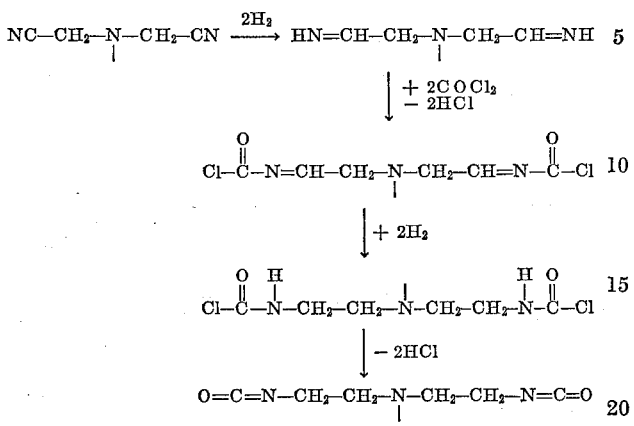

It is generally known that the cyanomethylamines employed in the process of this reaction cannot be hydrogenated to primary amines due to various decompositions and rearrangements; and thus it is fairly clear that the phosgene does not react with a primary amine intermediate.

Suitable acid acceptor substances are selected from organic and inorganic materials which will react with HCl without liberating water, and will not undergo chemical reaction with phosgene, cyanomethylamine reactant, or poly (isocyanatoethyl) amine product. Suitable organic acceptor materials include pyridine, triethylenediamine and N,N' dimethylpiperazine. Sufficient acid acceptor material is required to react with at least one mole of HCl per mole of nitrile groups in the cyanomethylamine reactant. When only one mole of HCl is taken up by the acid acceptor per mole of nitrile groups during the autoclave reaction process, a carbamoyl chloride derivative of the isocyanate is generally obtained. The carbamoyl chloride, during the subsequent product recovery operation, readily splits off a molecule of HCl to form the isocyanate. Formation of the isocyanate product is especially rapid at temperatures above 105° C. The carbamyl chloride product however, which is essentially an HCl addition product of the isocyanate, is a valuable product in itself since it may be employed to produce essentially the same reaction products as the isocyanate. Mixtures of isocyanates and the corresponding carbamyl chlorides which may be obtained by the process of this invention are thus of considerable value. Such mixtures, or either individual component, may be employed in solution as obtained from the autoclave reaction without isolation. When two moles of HCl are taken up by the acid acceptor during the autoclave process, per mole of nitrile groups, the isocyanate is directly obtained. The acid acceptor may also function as the liquid vehicle.

The acid acceptor substance may be selected from the group of tertiary organic amines known to function as catalysts in the reactions of isocyanates with active-hydrogen compounds. The autoclave reaction product mixture would thus be well suited for application directly in any of the chemical processes for which the poly isocyanates of this invention are suited. Typical species of catalytic tertiary amines include: bicyclic triethylene diamine, N,N' diethyl piperazine, and tris(N,N dimethylaminoethyl) amine prepared by the catalytic hydrogenation of nitrilotriacetonitrile in the presence of formaldehyde.

The poly (isocyanatoethyl) amine products of this invention are generally obtained as oils or amorphous solids, depending upon molecular weight; and are highly reactive toward compounds containing active hydrogen. Ascertainment of melting or boiling points, or purification by distillation is difficult in view of the tendency of the isocyanates to polymerize upon heating in pure form. The products may in general be purified by methods such as: treatment with activated charcoal; chromatographic adsorption on elution columns employing anhydrous adsorbent packings; and fractional precipitation from solvent-non-solvent systems. Analytical methods found useful in characterizing the products are: elemental analysis; preparation and analysis of derivatives and degradation products; infra-red spectophotometric analysis; nuclear magnetic resonance spectra; functional group analysis; and other conventional physical and chemical methods of identification.

The following examples serve to illustrate the invention but they are not intended to limit it thereto. All parts and percentages are by weight unless otherwise indicated.

*Example I*

Into a one gallon autoclave provided with heating means, agitator, and gas inlet and outlet means, was charged 900 grams chlorobenzene, 316 grams (4.0 moles) pyridine, 134 grams (1.0 mole) nitrilotriacetonitrile, 15 grams of palladium catalyst on a charcoal carrier, and 325 grams (3.3 moles) phosgene. The autoclave was then opened to a calibrated volume of hydrogen at 250 p.s.i.g., and the mixture was heated at 70° C. with continuous agitation. In sixteen hours time the mixture takes up 5.7 moles of hydrogen, 95% of the theoretical amount. The autoclave is then cooled, carefully vented, and flushed with dry nitrogen. The reaction mixture is removed and filtered to remove catalyst and pyridine hydrochloride salt. The filtrate is treated with activated charcoal and re-filtered. The chlorobenzene is removed by evaporation at 110° C., during which process the reaction product loses HCl. The residual material is subsequently purified by fractional precipitation from cyclohexane-dimethyl-formamide solvent mixtures. The product, tris (isocyanatoethyl) amine is obtained in 63% yield as a non-distillable yellow oil.

*Example II*

The isocyanate product of Example I is employed as a shrink-proofing agent for wool in the following fashion:

An undyed woolen flannel fabric, 7 oz./yd.$^2$, is exhaustively extracted with diethyl ether and ethanol, and is dried for one hour at 105° C. in a circulating air oven. A 20 gram piece of the dry fabric is then treated with 100 grams of a solution of 60 parts anhydrous dimethylformamide and 40 parts of the isocyanate product of Example I. The solution is allowed to remain in contact with the fabric for 30 minutes at 100° C., whereupon the fabric is rinsed in pure dimethylformamide, and dried. The uptake of the isocyanate by the fabric is approximately 36%.

The treated fabric and an untreated sample are than submitted to eight home laundry washing cycles using a Westinghouse automatic washer employing 0.5% aqueous sodium oleate at 40° C. Upon drying, it is found that the untreated control fabric has undergone a 49% area shrinkage, whereas the treated fabric has undergone only 2% area shrinkage.

*Example III*

Into a one gallon autoclave provided with heating means, agitator, and gas inlet and outlet means, was charged 2400 grams of xylene, 426 grams (3.0 moles) N, N' diethylpiperazine, 347 grams (1.0 mole) stearyl, bis (cyanomethyl) amine, 15 grams of colloidal platinum oxide catalyst, and 235 grams (2.4 moles) phosgene. The autoclave was then opened to a calibrated volume of hydrogen at 200 p.s.i.g., and the mixture was heated at 60° C. with continuous agitation. In fifteen hours time the mixture takes up 3.8 moles of hydrogen, 92.5% of the theoretical amount. The autoclave is then cooled, carefully vented, and flushed with dry nitrogen. The reaction mixture is filtered to remove catalyst and other insoluble materials. The filtrate is treated with activated charcoal and refiltered. The mixture is reduced to half its volume by evaporation of xylene at 110° C.

100 parts of the concentrated xylene solution, containing 35% stearyl, bis (isocyanatoethyl) amine are mixed with 103 parts of a hydroxyl-terminated polyester polymer of ethylene glycol and phthalic anhydride having a molecular weight of 1200. The solution begins to thicken immediately upon mixing, and is applied as a coating to glass, wood and metal surfaces. The coated surfaces are dried at 120° C. for ninety minutes. The hardened coatings thus obtained show excellent adhesion, hardness, gloss, and resistance to ordinary solvent chemicals.

*Example IV*

The process of Example I is repeated employing the same apparatus and essentially the same process conditions. One mole of ethylenediaminetetraacetonitrile is employed as the cyanomethylamine reactant, with six moles of bicyclic triethylene diamine, 900 grams chlorobenzene, four moles of phosgene, and 15 grams of palladium oxide catalyst. The mixture takes up 7.5 moles of hydrogen in seventeen hours, after the addition of a fresh 10 gram sample of catalyst. The product, N, N, N', N' tetraisocyanatoethyl ethylenediamine, is obtained in 47% yield as a dark yellow amorphous solid which polymerizes on heating and reacts violently with compounds containing active hydrogen.

As many widely different embodiments may be derived without departing from the spirit and scope of this invention, it is to be understood that the invention is to be in no wise restricted save as set forth in the appended claims.

I claim:

1. poly (isocyanatoethyl) amine compounds represented in the formula:

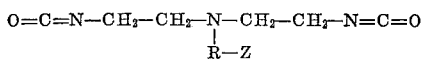

wherein R is a bivalent hydrocarbon radical of 1 to 18 carbon atoms having no active hydrogen, and Z is a member selected from the group consisting of hydrogen, N, N bis (isocyanatoethyl) amino, and isocyanatomethyl.

2. A process for the production of isocyanates and their derivatives comprising treating cyanomethylamine compounds having the structure:

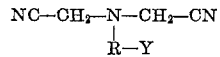

wherein R is a bivalent hydrocarbon radical of 1 to 18 carbon atoms having no active hydrogen, and Y is a member selected from the group consisting of N, N bis cyanomethylamino, hydrogen, and cyano, with hydrogen at elevated pressure, a hydrogenation catalyst, phosgene, and an acid acceptor substance.

3. The process of claim 2, employing at least 0.5 moles of phosgene and 1.7 to 2.0 moles of hydrogen per mole of cyano groups in said cyanomethylamine compound.

4. A process for the production of isocyanates and their derivatives comprising reacting cyanomethylamine compounds having the structure:

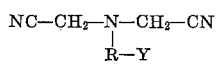

wherein R is a bivalent hydrocarbon radical of 1 to 18 carbons, and Y is a member selected from the group consisting of N, N bis cyanomethylamino, hydrogen and cyano, with hydrogen and phosgene at a temperature in the range of 50° C.–150° C. in the presence of a hydrogenation catalyst and an organic amine which functions as a acid acceptor substance.

References Cited by the Examiner

Degering "Organic Nitrogen Compounds," pp. 203–4, and p. 543 (1945).

CHARLES B. PARKER, *Primary Examiner.*